Figure 1:
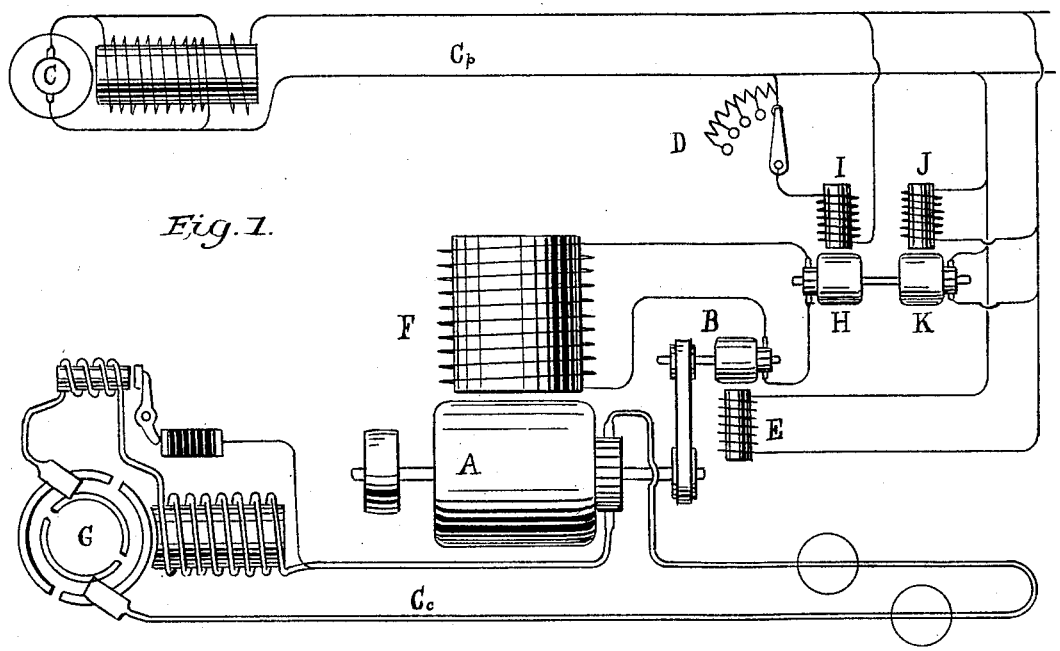

(No Model.) 2 Sheets—Sheet 1.

G. S. DUNN.
INDIRECT REGULATION OF DYNAMO ELECTRIC MACHINERY.

No. 591,345. Patented Oct. 5, 1897.

Witnesses:
Samuel W. Balch
Hy H. Whitman

Inventor,
Gano S. Dunn,
by Thomas Ewing, Jr.,
Attorney.

(No Model.) 2 Sheets—Sheet 2.
G. S. DUNN.
INDIRECT REGULATION OF DYNAMO ELECTRIC MACHINERY.
No. 591,345. Patented Oct. 5, 1897.
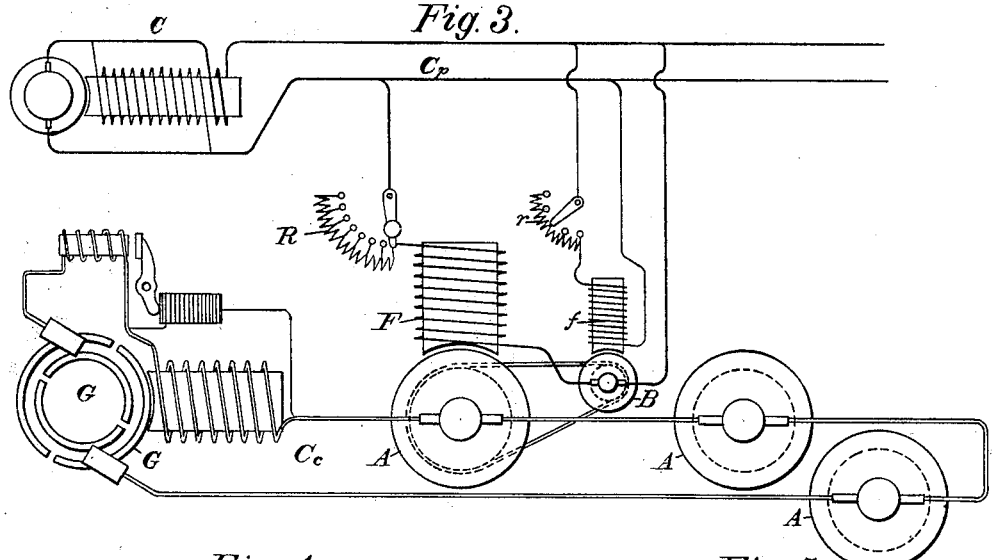
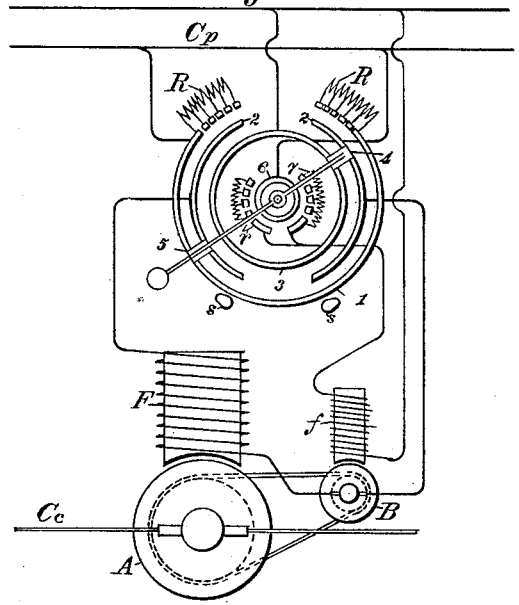
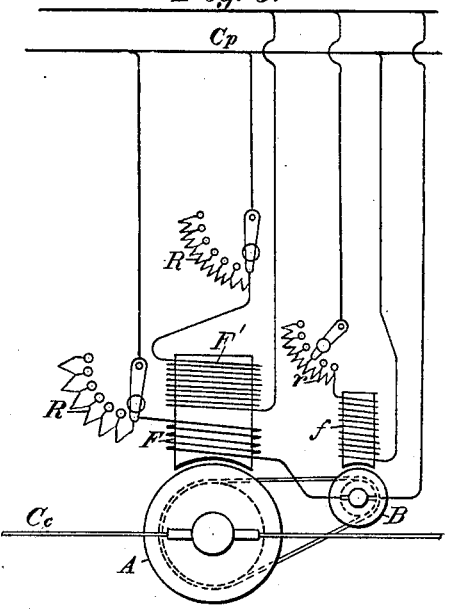

UNITED STATES PATENT OFFICE.

GANO S. DUNN, OF EAST ORANGE, NEW JERSEY, ASSIGNOR TO THE CROCKER-WHEELER ELECTRIC COMPANY, OF NEW JERSEY.

INDIRECT REGULATION OF DYNAMO-ELECTRIC MACHINERY.

SPECIFICATION forming part of Letters Patent No. 591,345, dated October 5, 1897.

Application filed June 22, 1897. Serial No. 641,786. (No model.)

*To all whom it may concern:*

Be it known that I, GANO S. DUNN, a citizen of the United States of America, residing at East Orange, county of Essex, State of New Jersey, have invented certain new and useful Improvements in Indirect Regulation of Dynamo-Electric Machinery, of which the following is a specification.

My invention is applicable to the regulation of dynamo-electric machinery generally, whether the machine to be regulated is used as a generator or as a motor; but in this application I describe more particularly its application to motors to maintain constant speed under varying load. Its application to the regulation of dynamos is described and claimed in my other application, Serial No. 598,692, filed July 10, 1896.

In the system shown in my United States Patent No. 549,061, dated October 29, 1895, the armatures of the working motor are supplied from a constant-current source, to which they are connected in series, and their fields supplied from a constant-potential source, to which they are connected in multiple. According to my present invention I connect the working motors in the constant-current and constant-potential circuits in the manner indicated in my patent, and add to the apparatus described in that patent, with each motor to be regulated, a regulating dynamo-electric machine the armature of which is connected in series with the field-coils or a part of the field-coils of the working motor, and is driven in a constant field at a rate which varies proportionately and simultaneously with any variations in the speed of the armature of the working motor. The strength of the field of the working motor will depend on the balance between a constant electromotive force and the electromotive force developed in the armature of the regulating-machine, which latter varies with the speed of the working-motor armature. Thus the speed of the working-motor armature remains approximately constant under varying load.

All of the field-circuits for the working motors may be supplied from a common constant-potential source or may have local field-circuits, as preferred.

The expression "working motor" is used above because any one examining the drawings without having had the full description will readily see which machine this expression refers to; but hereinafter the more accurate term "the machine to be regulated" will be used to designate that machine the speed of which it is the object of my invention to maintain constant under varying load.

Figure 2:
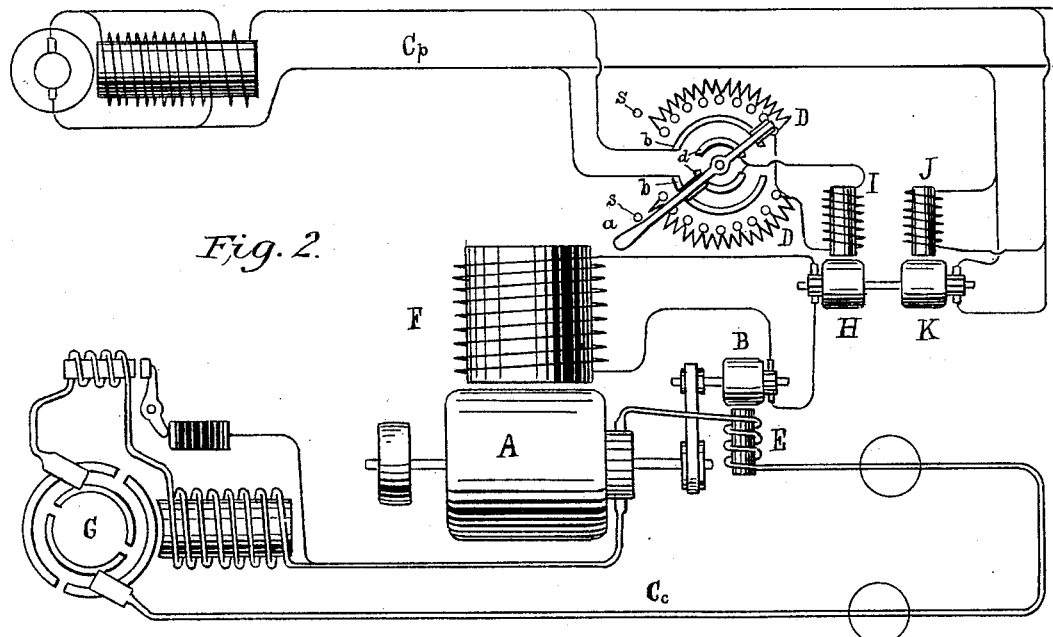

In the accompanying drawings, which form a part of this specification, Figure 1 is a diagrammatic representation of one form of my system. Fig. 2 is a diagrammatic representation of a somewhat modified form. Fig. 3 is a form less general in its utility than that of Figs. 1 and 2, but preferable under certain conditions which arise in practice. Figs. 4 and 5 are modifications of Fig. 2.

Referring now to Fig. 1, the armatures of the machines to be regulated are arranged in series. One of the armatures A is drawn in full, the others being indicated by circles. The circuit C c in which they are connected is a constant-current circuit supplied by a suitable generator G. The field F of the machine is connected in a local field-circuit which includes the armature B of the regulating-machine and the armature H of a motor-dynamo. Normally the armature of the regulating-machine is driven by the current from the generator-armature of the dynamo-tor and opposes a counter electromotive force. The fields of the regulating-machine E and of the motor-dynamo I and J, and the other armature K of the motor-dynamo are all connected in multiple to the constant-potential circuit C p, which is supplied by a suitable generator C. In series with the field I of the motor-dynamo is a rheostat D, the purpose of which is to control the speed which the armature of the machine to be regulated shall maintain. The armatures H and K are coupled together, and the armatures B and A are connected by a belt or other suitable connection.

Fig. 2 differs from Fig. 1 in two particulars only. First, the field of the regulating-machine is supplied from the constant-current circuit C c, but whether supplied from the constant-current or the constant-potential circuit the field is constant, which is all that is desired. Second, a reversing-switch is introduced in place of the rheostat of Fig. 1. This is for reversing the armature of the machine to be regulated and controlling the speed which it shall maintain. The switch is provided with two rheostats D D, which perform a function similar to that of the rheostat D of Fig. 1. These rheostats are connected with one terminal of the field-coil I. The other terminal of this field-coil is connected with two plates $d\ d$. Two other plates $b\ b$ are connected each respectively to one of the two leads of the constant-potential circuit $C\ p$. The parts $D\ D\ d\ d\ b\ b$ are insulated and the switch is provided with an insulating switch-arm $a$, which has two contact-pieces, one positioned to connect one of the rheostats D with one of the plates $b$ and the other positioned to connect the other plate $b$ with one of the plates $d$. Stops $s\ s$ are provided for limiting the path of the arm $a$.

The operation, which is the same substantially for the two figures, will be described with reference to Fig. 2.

The constant-current generator G supplies to the circuit $C\ c$ a constant current. This supplies energy to the armature A of the machine to be regulated and charges the field E of the regulating-machine. The constant-potential generator C supplies the circuit $C\ p$. This supplies energy to run the dynamo-tor and to charge the field I. The speed of the generator-armature H is constant, and the electromotive force developed in it depends upon the direction and strength of its field I, which is controlled by the reversing-switch. The armature of the regulating-machine runs at a speed varying with that of the armature A of the machine to be regulated, which it normally helps to drive, and develops an electromotive force which varies with the speed. The strength of the field F, and hence the speed of the armature A of the machine to be regulated, is determined by the resistance in the field-circuit and by the electromotive forces developed in the generator-armature of the motor-dynamo and the armature of the regulating-machine. Should the speed of the machine to be regulated rise above the predetermined speed, the electromotive force generated in the armature of the regulating-machine would be increased. In like manner, should the speed of the armature of the machine to be regulated be diminished the electromotive force in the armature of the regulating-machine would be diminished. Since the electromotive force developed in the armature of the regulating-machine while the machine to be regulated is running at normal speed is a counter electromotive force, any increase or diminution therein will result in increase or diminution in strength of the field F, with consequent increase or diminution of the torque of the armature of the machine to be regulated, resulting in the maintenance of practically constant speed. Should the increase in the electromotive force of the regulating-machine be so great as to reverse the field of the machine to be regulated, the armature thereof will tend to reverse and its speed will be checked.

In starting up the system of Fig. 1 the proper method is first to close the circuit through the armature of the machine to be regulated, then to close the circuit of the field and armature of the motor part of the motor-dynamo, and then to close the circuit of the field of the dynamo part of the motor-dynamo and gradually cut out the resistance therein. The switches are generally omitted. The proper method of starting the system shown in Fig. 2 is the same as above, the circuit of the field G being closed at the same time with the circuit of the armature and field of the motor part of the motor-dynamo.

Fig. 2 illustrates a system wherein the motor can be run at a constant speed on a constant-current circuit and can be varied from the maximum speed in one direction through any intermediate speed to the maximum speed in the opposite direction—that is, it can be run very fast in either direction, or very slowly in either direction, or brought to rest, or, in short, run at any desired speed. The regulation is accomplished, as in Fig. 1, by machines which may be very small in comparison with the size of the motor to be regulated, because the regulating-machines control the field-currents only.

Figs. 3, 4, and 5 illustrate systems which, though in many instances preferable to the foregoing system, are subject to the defect that the machine to be regulated cannot be so accurately regulated at extremely-low speeds. The speed is only variable and controllable accurately above a certain minimum speed. These figures, therefore, illustrate particular cases of the more general case set forth in the foregoing systems. A reversing-switch is shown in the drawings in Fig. 4, but, as shown in Figs. 3 and 5, the systems may be operated without the reversing-switch, if desired, an ordinary resistance being connected up with the field-circuits of the two machines instead of the reversing-switch, as shown in Fig. 4.

The construction of the switch shown in Fig. 4 is as follows: The contact-strips 1, 2, 3, 6, and $r$ are insulated from each other and arranged in concentric circles or arcs of circles. The outer strip 1 is the arc of a circle the ends of which terminate in sets of resistance-coils R. The strip is connected to one lead of the constant-potential circuit $C\ p$. A strip 3, which embraces an entire circle, is connected to the other lead of this constant potential. Between strips 1 and 3 are two strips 2, each extending through less than a semicircle of arc. These two strips are the terminals of a conductor which includes the field-coils F of the machine to be regulated and the armature $a$ of the regulating-machine in series with each other. Two brushes 4 and 5 at either end of the insulated arm, pivoted in the center of the switch, complete the reversing and starting part of the switch and constitute a complete switch for the field of the working motor. There are also two sets of resistance-coils *r* connected to a terminal of the field-coils of the regulating-machine and an inner ring 6 connected to one of the leads of the constant-potential circuit or to the plate 1. These, with contact-plate 7, which is mounted on the same arm with plates 4 and 5, form the circuit-closing and regulator switch for the field *f* of the regulating-machine. The contact-strips of these two switches and their contact-plates are so set relatively to each other that the two switches shall be opened and closed together. These sets of resistance-coils are for starting and stopping and for obtaining extremely-low speeds of the armature of the working motor for various purposes. The speeds obtained when these coils are called into requisition are not so constant as the speed obtained in other positions of the apparatus. Usually the resistance-coils R will not be used concurrently with the coils *r*, since double regulation of the field F by resistance and indirectly through the regulating-machine is not desirable. A certain speed corresponds to each button of the resistance-coils *r*, which the working motor will attain and maintain approximately under varying load.

The general operation of the system shown in Figs. 3, 4, and 5 is essentially the same, but the system of Fig. 4 being more complex the operation will be stated with particular reference to Fig. 4. The constant-potential field-circuit being open at the switch is closed through the field-coils F *f* by moving the switch-arm to the left or right of the zero position, according to the direction in which the working motor is to be driven. The current passes from the common constant-potential source C through the switch, through the field-coils F of the machine to be regulated, and the armature B of the regulating-machine. Also the current passes from the common constant-potential source through the regulator 6 7 *r* and the field *f* of the regulating-machine. As soon as there is any field established for the machine to be regulated its armature begins to revolve under the influence of the current in the constant-current circuit. The armature B of the regulating-machine is thereby also driven, being, as is shown, coupled to the armature of the machine to be regulated. The field F of the machine to be regulated is then further strengthened by cutting out the resistance-coils R, and when these are passed the switch-arm of the regulator 6 7 *r* has reached the set of buttons connected with the resistance-coils and is set on any desired button. This determines the speed at which the machine to be regulated shall run. The regulating-machine is driven by the current from the constant-potential circuit and opposes to the current through the field-coils F a counter electromotive force which regulates the strength of the field of the machine to be regulated. If the load on the machine be lessened and this machine in consequence speeds up, the regulating-machine will also speed up and its counter electromotive force will be increased, whereby the field of the machine to be regulated will be cut down, and, vice versa, if the load is increased the field strength of the machine to be regulated will be increased. Increase in the field strength of the machine to be regulated prevents decrease in the speed of its armature, and diminution of its field strength prevents increase in the speed of its armature. Small changes in the speed of the armature of the machine to be regulated, and hence of the regulating-machine, make large changes in the strength of the field of the machine to be regulated. Therefore the speed of the machine to be regulated can be kept very nearly constant even with large variations in the load. The energy consumed at the regulating-machine helps to drive the machine to be regulated. Should the speed be so increased as to cause the regulating-machine to generate current, the field of the machine to be regulated will be reversed and its armature will be checked. The armature of the regulating-machine now acts as a drag, as does also the field of the machine to be regulated. The speed will therefore quickly fall to normal. Since the energy required by the field of any machine is exceedingly small compared with the energy required by the armature, the regulating-machine in my system may be small compared with a controller which controls the energy supplied to the armature, though not so small in the systems of Figs. 3 and 4 as in the systems of Figs. 1 and 2.

In Fig. 5 the field of the machine to be regulated is provided with two field-coils F F', both wound in the same direction and both supplied from the constant-potential circuit; but one of the field-coils F is connected in series with the armature B of the regulating-machine. Each of the field-coils of the machine to be regulated is connected in series with a rheostat R R', and the field-coil of the regulating-machine is also connected with the rheostat *r*, as shown. The general operation of the system is clear from the foregoing statement of operation of Fig. 4. An advantage of dividing the field of the machine to be regulated is that there need be in the circuit which includes the armature of the regulating-machine less energy than is necessary with the arrangements of Figs. 3 and 4. Hence the regulating-machine need not be so large. For example, if only half of the field strength of the machine to be regulated is derived from coils that are in circuit with the regulating-machine this machine need be only half as large as where all of the field strength is derived from coils in circuit with the armature of the regulating-machine. A disadvantage of dividing the field of the machine to be regulated is that the braking effect obtained when the armatures of the machine to be regulated and the regulating-machine suddenly speed up with a resultant reversal of the field of the machine to be regulated is never so powerful with the divided field, because the reversal of the field of the machine to be regulated is less pronounced, and a small armature for the machine to be regulated does not act as so heavy a drag as a larger armature would act.

With the systems which I have described herein if the potential in the constant-potential circuit is constant the speed of the machine to be regulated will be approximately constant under wide variations of load and under considerable variations in the strength of the current in the constant-current circuit, particularly where, as in Figs. 1, 3, 4, and 5, the field of the regulating-machine is supplied from a constant-potential source, and in the systems of Figs. 3, 4, and 5 changes in the potential of the common constant-potential circuit C p produce two effects in the system, which oppose and tend to neutralize each other. The armature B of the regulating-machine being driven at the same speed with the armature A of the machine to be regulated, each new potential of the circuit C p will be accompanied by a corresponding change in the current in the field-circuits of the regulating-machine and the machine to be regulated. Suppose, for instance, the potential falls. This would tend to cause a decrease in the current in the field-circuit of the machine to be regulated were it not for the fact that it is accompanied by a decrease in the field strength of the regulating-machine; but a decrease in the field strength of the regulating-machine without change in the armature diminishes the counter electromotive force developed in the regulating-machine, and this tends to increase the strength of the current in the field-circuit of the machine to be regulated. On the other hand, should the potential rise the resultant tendency to increase the current in the field-circuit of the machine to be regulated would be counteracted by the resulting increase in the counter electromotive force generated in the armature of the regulating-machine.

It will be clear from the foregoing description that many changes may be made in my system without departing from the spirit of my invention. I have not undertaken to indicate all of the different combinations which may be adopted, but have shown a number of general forms with a view to indicating that the specific arrangement may be widely varied.

It will be seen that the essence of the invention is the method of regulating electric motors, which consists in supplying the armature with a constant current and controlling the field by the speed of the motor. This field is supplied from a source of energy which is separate from that which supplies the armature, and which is preferably a constant-potential source, and I vary the field strength of the machine to be regulated by varying the effective electromotive force in the field-circuit with the speed in the armature of the machine to be regulated. This I prefer to accomplish by balancing a constant electromotive force against a variable electromotive force, the latter in the arrangement shown being developed in the armature of a regulating-machine which is mechanically connected to the armature of the machine to be regulated, and being varied proportionately and simultaneously with the speed of the machine to be regulated. In the form shown in Figs. 1 and 2 the source of constant-potential electromotive force is the generator-armature of a dynamotor driven in a constant field at a constant speed, and as the field of this generator-armature may be varied in strength or reversed I thereby control the field and through the field the armature of the machine to be regulated, both as to speed and direction of motion.

What I claim, and desire to secure by Letters Patent of the United States, is—

1. The method of regulating electric motors which consists in supplying the armature with a constant current, supplying the field from a source of energy separate from that which supplies the armature, and varying the field by varying the effective electromotive force in the field-circuit simultaneously with the speed of the armature of the machine to be regulated, substantially as described.

2. The method of regulating motors consisting in supplying the armature with a constant current, and supplying the field with the current resulting from balancing a constant electromotive force against an electromotive force which is varied proportionately and simultaneously with the speed of the machine to be regulated, substantially as described.

3. The method of regulating electric motors which consists in supplying the armature with a constant current, and supplying the field by balancing a constant potential against the electromotive force generated in a regulating-machine, and controlling the electromotive force generated in the regulating-machine by the speed of the armature of the machine to be regulated, substantially as described.

4. The method of regulating motors consisting in supplying the armature with a constant current, and supplying the field with the current resulting from balancing a constant electromotive force against the electromotive force of a dynamo-electric machine which is mechanically connected to the armature of the machine to be regulated and controlled by the speed thereof, substantially as described.

5. The method of regulating electric motors consisting in supplying the armature with a constant current and supplying the field with a current resulting from balancing a constant electromotive force against an electromotive force which is varied proportionately and simultaneously with the speed of the machine to be regulated, and varying or reversing the potential of the constant-potential source, substantially as described.

6. The method of regulating electric motors which consists in supplying the armature with a constant current, supplying the field from a source of energy separate from that which supplies the armature, consisting of two armatures, provided with constant fields and connected in series with the field of the machine to be regulated, driving one of these armatures at a constant speed, and varying the speed of the other of these armatures proportionately and simultaneously with the speed of the armature of the machine to be regulated, substantially as described.

7. The combination of a machine to be regulated, a constant-potential machine and a regulating-machine connected with the field of the machine to be regulated, and means for varying the speed of the armature of the regulating-machine proportionately and simultaneously with the speed of the armature to be regulated, substantially as described.

8. The combination of a machine to be regulated, a constant-potential machine and a regulating-machine connected with the field of the machine to be regulated, means for varying the speed of the armature of the regulating-machine proportionately and simultaneously with the speed of the armature of the machine to be regulated, and means for reversing the field of the constant-potential machine, substantially as described.

9. The combination of two dynamo-electric machines with their armatures mechanically connected together, with field-coils of one in series with the armature of the other and a reversing-switch in circuit with said armature and field, and a circuit-closer to control the other field, the reversing-switch and circuit-closer being mechanically connected, substantially as described.

Signed by me, at Newark, New Jersey, this 10th day of June, 1897.

GANO S. DUNN.

Witnesses:
HENRY C. WARE,
FREDK. K. VREELAND.